(12) United States Patent
Sauer et al.

(10) Patent No.: US 8,895,138 B2
(45) Date of Patent: Nov. 25, 2014

(54) IMPACT RESISTANT COMPOSITE ARTICLE

(75) Inventors: Bryan Benedict Sauer, Boothwyn, PA (US); Jeffrey Alan Hanks, Midlothian, VA (US); William George Kampert, Wilmington, DE (US); Brian Charles West, Wilmington, DE (US); William Charles Walker, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 860 days.

(21) Appl. No.: 12/619,807

(22) Filed: Nov. 17, 2009

(65) Prior Publication Data

US 2011/0117351 A1  May 19, 2011

(51) Int. Cl.
| | |
|---|---|
| *B32B 33/00* | (2006.01) |
| *B32B 27/00* | (2006.01) |
| *B29C 43/00* | (2006.01) |
| *B32B 5/26* | (2006.01) |
| *B32B 27/04* | (2006.01) |
| *F41H 5/04* | (2006.01) |

(52) U.S. Cl.
CPC . *B32B 27/04* (2013.01); *B32B 5/26* (2013.01); *F41H 5/0478* (2013.01); *Y10S 525/919* (2013.01)
USPC ............... 428/221; 428/297.4; 428/297.7; 156/60; 156/278; 525/919

(58) Field of Classification Search
USPC ............... 442/168; 525/919; 428/221, 297.4, 428/297.7; 156/60, 278
See application file for complete search history.

(56) References Cited

U.S. PATENT DOCUMENTS

| | | | | |
|---|---|---|---|---|
| 3,404,134 A | * | 10/1968 | Rees ............................. | 525/362 |
| 3,404,137 A | | 10/1968 | DuPont | |
| 4,104,216 A | * | 8/1978 | Clampitt ....................... | 524/300 |
| 4,137,394 A | | 1/1979 | Meihuizen et al. | |
| 4,356,138 A | | 10/1982 | Kavesh et al. | |
| 4,413,110 A | | 11/1983 | Kavesh et al. | |
| 4,457,985 A | | 7/1984 | Harpell et al. | |
| 4,536,536 A | | 8/1985 | Kavesh et al. | |
| 4,551,296 A | | 11/1985 | Kavesh et al. | |
| 4,599,267 A | | 7/1986 | Kwon et al. | |
| 4,678,702 A | | 7/1987 | Lancaster et al. | |
| 4,879,165 A | * | 11/1989 | Smith ........................... | 428/212 |
| 5,210,138 A | * | 5/1993 | Yamamoto et al. ........... | 525/183 |
| 5,330,820 A | | 7/1994 | Li et al. | |
| 6,990,886 B2 | | 1/2006 | Citterio | |
| 7,458,103 B2 | | 12/2008 | Citterio | |
| 2005/0282450 A1 | | 12/2005 | Sauer et al. | |
| 2007/0117483 A1 | | 5/2007 | Bhatnagar et al. | |
| 2007/0154694 A1 | * | 7/2007 | Samuels et al. ................ | 428/216 |
| 2008/0064280 A1 | | 3/2008 | Bhatnagar et al. | |
| 2008/0241494 A1 | * | 10/2008 | Ardiff et al. ................... | 428/219 |
| 2009/0233508 A1 | | 9/2009 | Kubota et al. | |
| 2011/0113534 A1 | | 5/2011 | Sauer et al. | |
| 2012/0180940 A1 | | 7/2012 | Bader et al. | |

FOREIGN PATENT DOCUMENTS

| | | |
|---|---|---|
| EP | 0064167 | 11/1985 |
| GB | 359019 | 10/1931 |
| GB | 2042414 | 2/1980 |
| GB | 2051667 | 6/1980 |
| WO | WO 2008/116303 | 10/2008 |
| WO | WO 2008/121677 | 10/2008 |
| WO | WO 2008/137218 | 11/2008 |
| WO | WO 2009/109632 | 9/2009 |

OTHER PUBLICATIONS

PCT International Search Report and Written Opinion for International Application No. PCT/US2010/056148 dated Mar. 8, 2010.
Roy C. Liable et al.,The Application of High Modulus Fibers to Ballistic Protection, J. Macromel Sci. Chem., A7 (1), pp. 295-322, 1973.
Eisaku Hirasawa et al., Effect of Metal Cation Type on the Structure and Properties of Ethylene Ionomers.Joumal of Applied Polymer Science, vol. 42, 351-362 (1991).

* cited by examiner

*Primary Examiner* — Matthew Matzek

(57) ABSTRACT

An impact resistant composite article has two or more layers of ballistic fabric and ionomer layers disposed between the fabric layers. The ionomer is highly neutralized so that it has essentially no melt flow. A process also for making such a composite article that involves deposition of an aqueous colloid of the ionomer onto the fabric, followed by drying.

19 Claims, No Drawings

IMPACT RESISTANT COMPOSITE ARTICLE

FIELD OF THE INVENTION

This invention relates to lightweight armor, composite structures comprising an acid copolymer and a fabric comprising impact resistant fibers.

BACKGROUND

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. Fibers may be encapsulated or embedded in a matrix material.

Phenolic or modified polyester can also be added to these high strain ballistic fabrics in order to form composites in which the resin does little more than keep out water. Often a nonbonding rubber latex is added to enhance nonbonding to the high strain, high tenacity fiber (such as Kevlar®), in order that the high strain fiber breaks free of the composite matrix under impact and goes into tension along its length, immediately and thus carrying the impact load over as large an area as possible. The stopping power of the ballistic fabric stack is thereby increased.

Ionomers have been used to form composites with ballistic fibers. In U.S. Pat. No. 4,879,165 is disclosed an armor structure or high impact structure comprising a plurality of zones, at least one zone comprising an extruded ionomer resin. For example one ionomer or ionomer resin of the '165 invention is obtained by combining a copolymer of ethylene-methacrylic acid or ethylene-acrylic acid and a polyamine which contains at least one R—$CH_2$—$NH_2$ group, and the R may contain: (—$CH_2NH_2$)$_x$; (—$NH_2$)$_x$; or (R'R"NH)$_y$, where x=1 or more, and y=0 or more. R' and R" may be any organic groups.

The present inventors have discovered compositions that show a significant improvement in ballistic performance over the existing art in this area.

SUMMARY OF THE INVENTION

The present invention is directed to an impact resistant composite article comprising one or more stacks layered together, each stack comprising two or more fibrous layers with non-melt-processable ionomer disposed between at least two of the fibrous layers, in which the non-melt-processible ionomer is at least 85% neutralized and has a melt flow index<0.05 g/10 min at 190° C. melt flow test of ASTM D1238.

In a further embodiment, the invention is directed to a process for making a ballistic composite article comprising the steps of (i) making a first coated fibrous layer by applying a coating of an aqueous ionomer dispersion onto one side or both sides of a ballistic fibrous layer, (ii) substantially drying the first coated fibrous layer formed thereby at a temperature of between 20 and 200° C., (iii) forming a composite fabric by laying a second coated fibrous layer made by the process of steps (i) and (ii) in a manner such that the ionomer coating is at least disposed between the first and second fibrous layers (iv) laying subsequent coated fibrous layers onto the composite fibrous layer in the manner of step (iii) until a multilayer composite article with the required number of layers of coated fibrous layers is formed, where the weight fraction of solid ionomer in the multilayer composite article is between 5 and 16%, and (v) optionally, but preferably, pressing the composite article formed in step (iv) above at a temperature of between about 120 and 200° C., at a pressure of about 200-8000 pounds per square inch, for between about 5 to 30 minutes.

The process can further comprise the step of applying pressure to the coated fibrous layer formed in step (i).

The process can further comprise the steps of repeating step (iv), above, until the composite article comprises between 15 and 200, or preferably 40 to 80, coated fabric layers.

DESCRIPTION OF THE INVENTION

The present invention is directed to an impact resistant composite article comprising two or more stacks of fibrous fabric layers, the layers may comprise a repellant treatment on the fibers, and an ionomer layer disposed between at least some of the fabric layers. Preferably the ionomer comprises an olefin acid ethylene copolymer. The ionomer is at least 85% neutralized, preferably at least 95% neutralized and more preferably at least 100% neutralized. Neutralization refers to the level of inorganic cations that are present in the ionomer or olefin acid copolymer the high levels of neutralization lead to molten polymers with very low melt flow index (MFI) as measured at 190° or even at 200° C. It is generally known that polymers with MFI less than 0.1 g/10 min are too viscous to be melt processable in common processes such as melt extrusion, extrusion, injection molding, etc. The low melt flow corresponding to extremely high or infinite melt viscosity of essentially 100% neutralized non-melt processable ionomers provides novel laminates. Because of low melt flow during the composite article thermal consolidation, the degree of fabric impregnation by the resin can even be very low and still give surprisingly good ballistic performance.

By "composite article" is meant any type of construction, such as a panel, whether flat or otherwise that is described by this invention. A composite article may also include a product formed or molded from the invention, for example a helmet. The composite article of the invention may comprise an ionomer that in turn comprises between 5 mole-percent and 15 mole-percent of acid, preferably between 8 mole-percent and 12 mole-percent of acid.

By "stacks" is meant a multilayer construction of fibers. The composite article then may comprise a single stack, or it may comprise two or more stacks layered together. The stacks comprise a plurality of fibrous layers.

The ionomer may preferably be at least 95% neutralized or even 100% neutralized.

The ionomer may be in the form of a coating partially covering the fibers in at least some of the fibrous layers and may form a discrete layer between at least two of the fibrous layers. The fibrous layers may comprise bundles of fibers that are in turn assembled into a fibrous layer. In one embodiment of the invention, which the fibrous layers comprise fiber bundles and the ionomer does not penetrate any fiber layer or bundle more than 10% of its thickness. The ionomer layer may also penetrate the fibrous layers to any degree desired to obtain the desired final composite article properties. For example, the ionomer layer may not penetrate the fibrous layers that it comes into contact with. In a further embodiment, the ionomer layer may penetrate to the extent of less than 50% of the thickness of the cross section of a fibrous layer or fiber bundle within a fibrous layer.

The fibrous layers of the invention may comprise nonwoven fabrics or be at least partially woven. Some of the fibrous layers may be at least partially coated with a water repellant material.

The fibrous layer comprises fibers that may further comprise a polymer selected from the group consisting of, an aramid, a UHMWPE, a UHMWPP, poly vinylalcohol, polyazole and combinations or blends thereof. In one embodiment, the fibrous layer comprises poly (p-phenylene terephthalamide). In a further embodiment, the composite article comprises stacks that are made substantially of fibrous layers different materials. For example one stack of aramid fibers may be combined with a second stack that comprises fibrous layers of UHMWPE fibers. In a still further embodiment, any one stack may comprise fibrous layers of different compositions.

The ionomer may comprise an ethylene copolymer with an acid comonomer. Such an ethylene copolymer may be neutralized with an ion selected from the group consisting of sodium, potassium, lithium, silver, mercury, copper (I), beryllium, magnesium, calcium, strontium, barium, copper (II), cadmium, mercury, tin, lead, iron, cobalt, nickel, zinc, aluminum, scandium, iron, yttrium, titanium, zirconium, hafnium, vanadium, tantalum, tungsten, chromium, cerium, iron and combinations thereof.

The fibrous material may further be coated with a water repellant material. For example the water repellant material may comprise a material that is at least partially fluorinated. In one embodiment, the at least partially fluorinated material is selected from the group consisting of a partially fluorinated acrylate copolymer and a partially fluorinated methacrylate copolymer.

The ionomer may be applied to the fabric layers in the form of a dispersion. Related are ionomer suspensions and emulsions. The dispersion may be a blend dispersion with other, non ionomeric, polymers in which the ionomer comprises at least 70% by weight of the solid content of the dispersion. The ionomer may further be applied to the fabric layers in the form of an aqueous dispersion.

The ionomer may further be plasticized or be blended with a surfactant. In one embodiment, the ionomer will comprise at least 70% by weight of the ionomer plus plasticizer or other additive, for example a surfactant. For example the plasticizer or surfactant may be a long chain fatty acid, for example 1-decanol.

In a further embodiment, the invention is directed to a process for making a ballistic composite article comprising the steps of (i) making a first coated fibrous layer by applying a coating of an aqueous ionomer dispersion onto one side or both sides of a ballistic fibrous layer, (ii) substantially drying the first coated fibrous layer formed thereby at a temperature of between 20 and 200° C., (iii) forming a composite fabric by laying a second coated fibrous layer made by the process of steps (i) and (ii) onto the first layer in a manner such that the ionomer coating is at least disposed between the first and second fibrous layers, (iv) laying subsequent coated fibrous layers onto the composite fibrous layer in the manner of step (iii) until a multilayer composite article with the required number of layers of coated fibrous layers is formed, where the weight fraction of solid ionomer in the multilayer composite article is between 5 and 16%, and (v) pressing the composite article formed above at a temperature of between about 120 and 200° C., at a pressure of about 200-8000 pounds per square inch, for between about 5 to 30 minutes.

The process can further comprise the steps of repeating step (iv), above, until the composite article comprises between 15 and 200, or preferably 40 to 80, coated fabric layers.

The fibrous layer employed in the invention comprises fiber that can be woven and can further comprise an aramid, even poly (p-phenylene terephthalamide), or ultra high molecular weight high density polyethylene. The fibrous layer may be referred to herein as a "fabric", for example when referring to Kevlar® or other specific constructions when describing the fibrous layer. Similarly the fibrous layer may be referred to as a nonwoven "fabric." By nonwoven it is meant that in some embodiments the fabric can be a unidirectional fabric, a multi-axial fabric, or a three-dimensional fabric, either of these provided with or without binder. The multi-axial fabric can have layers of yarn oriented at an angle with respect to adjacent layer(s), and these layers can comprise unidirectional arrays of yarns. The three-dimensional fabrics can also comprise unidirectional arrays of yarns.

The terms "fibrous layer" and "fabric" are therefore synonymous as used herein.

For the purposes of the present invention, fiber is an elongate body the length dimension of which is much greater than the transverse dimensions of width and thickness. Accordingly, the term fiber includes monofilament fiber, multifilament fiber, ribbon, strip, a plurality of any one or combinations thereof and the like having regular or irregular cross-section.

Composite articles of the present invention can comprise a fiber network that may be nonwoven or partially woven. The fiber type is determined by the ballistic properties required of the composite article. For example the fibers may comprise highly oriented ultra-high molecular weight polyethylene fiber (UHMWPE), highly oriented ultra-high molecular weight polypropylene fiber (UHMWPP), aramid fiber, polyvinyl alcohol fiber or combinations or blends, including mixtures of fibers made of different materials or blends of different polymers in one fiber. U.S. Pat. No. 4,457,985 generally discusses oriented ultra high molecular weight polyethylene and polypropylene fibers, the disclosure of which is hereby incorporated by reference to the extent not inconsistent herewith. In the case of polyethylene, suitable fibers are those highly orientated fibers of weight average molecular weight of at least about 500,000, preferably at least about one million and more preferably between about two million and about five million. Known as extended chain polyethylene (ECPE) fibers, such fibers may be produced from polyethylene solution spinning processes described, for example, in U.S. Pat. No. 4,137,394 to Meihuzen et al. or U.S. Pat. No. 4,356,138 to Kavesh et al., or spun from a solution to form a gel structure as described in German Off. No. 3,004,699, GB No. 2051667, and especially as described in application Ser. No. 259,266 of Kavesh et al. filed Apr. 30, 1981 and application Ser. No. 359,019 (continuation-in-part of Ser. No. 259,266) (see EPA No. 64,167, published Nov. 10, 1982).

As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 25 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated therewith.

Depending upon the fiber-forming technique, the draw ratio and temperatures, and other conditions, a variety of properties can be imparted to polyethylene fibers. The tenacity of the fibers is ordinarily at least about 15 grams/denier, preferably at least about 20 grams/denier, more preferably at least about 25 grams/denier and most preferably at least about 30 grams/denier.

Similarly, the tensile modulus of the fibers, as measured by an Instron tensile testing machine, is ordinarily at least about 300 grams/denier, preferably at least about 500 grams/denier, more preferably at least about 1,000 grams/denier and most preferably at least about 1,500 grams/denier. These highest values for tensile modulus and tenacity are generally obtainable only by employing solution spun or gel spun processes. In addition, many ECPE fibers have melting points higher than the melting point of the polymer from which they were formed. Thus, for example, whereas ultra-high molecular weight polyethylenes of 500,000, one million and two million generally have melting points in the bulk of 134° C., the ECPE fibers made of these materials have melting points of up to 145° C. or higher. The increase in melting point reflects a higher crystalline orientation of the fibers as compared to the bulk polymer.

Improved ballistic resistant articles are formed when polyethylene fibers having a weight average molecular weight of at least about 500,000, a modulus of at least about 500 and a tenacity of at least about 15 g/denier are employed. Cf. John V. E. Hansen and Roy C. Laible in "Flexible Body Armor Materials," Fiber Frontiers ACS Conference, Jun. 10-12, 1974 (ballistically resistant high strength fibers must exhibit high melting point and high resistance to cutting or shearing); Roy C. Laible, Ballistic Materials and Penetration Mechanics, 1980 (noting that nylon and polyester may be limited in their ballistic effectiveness due to the lower melting point); and "The Application of High Modulus Fibers to Ballistic Protection", R. C. Laible, et al., J. Macromol. Sci. Chem., A7(1), pp. 295-322, 1973 (the importance of a high degree of heat resistance is again discussed).

In the case of polypropylene, highly oriented polypropylene fibers of weight average molecular weight at least about 750,000, preferably at least about one million and more preferably at least about two million may be used. Ultra high molecular weight polypropylene may be formed into reasonably highly oriented fibers by the techniques prescribed in the various references referred to above, and especially by the technique of U.S. Ser. No. 259,266, filed Apr. 30, 1981, and the continuations-in-part thereof, both to Kavesh et al. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least about 11 grams/denier. The tensile modulus for polypropylene is at least about 160 grams/denier, preferably at least about 200 grams/denier. The melting point of the polypropylene is generally raised several degrees by the orientation process, such that the polypropylene fiber preferably has a main melting point of at least about 168°, more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles. C.f. Laible, Ballistic Materials and Penetration Mechanics, supra, at p. 81 (no successful treatment has been developed to bring the ballistic resistance of polypropylene up to levels predicated from the yarn stress-strain properties); and the relative effectiveness of NTIS publication ADA018 958, "New Materials in Construction for Improved Helmets", A. L. Alesi et al. [wherein a multilayer highly oriented polypropylene film material (without matrix), referred to as "XP", was evaluated against an aramid fiber (with a phenolic/polyvinyl butyral resin matrix); the aramid system was judged to have the most promising combination of superior performance and a minimum of problems for combat helmet development].

Aramid fiber is formed principally from the aromatic polyamide. Aromatic polyamide fibers having a modulus of at least about 400 g/denier and tenacity of at least about 18 g/denier are useful for incorporation into composites of this invention. For example, poly(phenylenediamine terephalamide) fibers produced commercially by E. I. du Pont de Nemours & Company under the trade names of Kevlar® 29 and Kevlar® 49 and having moderately high moduli and tenacity values are particularly useful in forming ballistic resistant composites. (Kevlar® 29 has 500 g/denier and 22 g/denier and Kevlar® 49 has 1000 g/denier and 22 g/denier as values of modulus and tenacity, respectively).

In the case of polyvinyl alcohol (PV-OH), PV-OH fibers having a weight average molecular weight of at least about 500,000, preferably at least about 750,000, more preferably between about 1,000,000 and about 4,000,000 and most preferably between about 1,500,000 and about 2,500,000 may be employed in the present invention. Usable fibers should have a modulus of at least about 160 g/denier, preferably at least about 200 g/denier, more preferably at least about 300 g/denier, and a tenacity of at least about 7 g/denier, preferably at least about 10 g/denier and more preferably at least about 14 g/denier and most preferably at least about 17 g/denier. PV-OH fibers having a weight average molecular weight of at least about 500,000, a tenacity of at least about 200 g/denier and a modulus of at least about 10 g/denier are particularly useful in producing ballistic resistant composites. PV-OH fibers having such properties can be produced, for example, by the process disclosed in U.S. patent application Ser. No. 569,818, filed Jan. 11, 1984, to Kwon et al. and commonly assigned.

In the case of polyazoles, some preferred embodiments of polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothioazole, preferably it is poly(p-phenylene benzobisthiazole). If the polybenzazole is a polybenzoxazole, preferably it is poly (p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

The fibrous layer employed in the invention can be coated with a repellant material. By "repellant material" is meant a hydrophobic material that resists wetting by aqueous media, an agent comprising fluorine and carbon atoms being preferred. For example the fibrous layer can be at least partially coated with a fluorinated material. Alternatively the fluorinated material is selected from the group consisting of Zonyl® D fabric fluoridizer consisting of fluorinated methacrylate copolymers or Zonyl® 8300 fabric protector consisting of fluorinated acrylate copolymers. The treatment of fabrics with such fluorinated polymers and oligomers is common in the trade and is not limited to these chemicals. One skilled in the art will be able to choose a suitable treatment.

The water-repellent coating employed in the invention can in principle be any agent that repels water and that can be applied to the aramid fiber, an agent comprising fluorine and carbon atoms being preferred. A preferred water-repellent coating of the invention is one comprising a fluoropolymer, and especially a mixture of fluoroacrylate polymers. Kevlar® fabrics used here were obtained from JPS composites (Greenville, S.C.) and were made with 600 denier yarn and supplied as Style (S) 751. S751 fabric is available as Fluorinated surface treated (S751-F) or untreated Greige (S751-G) fabric.

Olefin-acid copolymers useful in the invention include but are not limited to ethylene-acrylic acid and ethylene methacrylic acid copolymers. The ethylene copolymer comprises 5%-25% mol percent acid comonomer, or preferably 8%-12% mol percent acid comonomer.

The ethylene copolymers utilized in the present invention can be neutralized by inorganic cations. By "degree of neutralization" is meant the mole percentage of acid groups on the ethylene copolymer that have an inorganic counterion To produce the ionomer copolymers disclosed herein, the parent acid copolymers are neutralized at least about 85%, or preferably, at least about 95% or more preferably, at least about 100%, based on the total number of equivalents of carboxylic acid moieties. Upon neutralization, the ionomers will have one or more metallic cations. Metallic ions that are suitable cations may be monovalent, divalent, trivalent, multivalent, or mixtures therefrom. Useful monovalent metallic ions include, but are not limited to, ions of sodium, potassium, lithium, silver, mercury, copper and the like and mixtures thereof. Useful divalent metallic ions include, but are not limited to, ions of beryllium, magnesium, calcium, strontium, barium, copper, cadmium, mercury, tin, lead, iron, cobalt, nickel, zinc and the like and mixtures therefrom. Useful trivalent metallic ions include, but are not limited to, ions of aluminum, scandium, iron, yttrium and the like and mixtures therefrom. Useful multivalent metallic ions include, but are not limited to, ions of titanium, zirconium, hafnium, vanadium, tantalum, tungsten, chromium, cerium, iron and the like and mixtures therefrom. It is noted that when the metallic ion is multivalent, complexing agents, such as stearate, oleate, salicylate, and phenolate radicals may be included, as disclosed within U.S. Pat. No. 3,404,134. The metallic ions used herein are preferably monovalent or divalent metallic ions. More preferably, the metallic ions used herein are selected from the group consisting of ions of sodium, lithium, magnesium, zinc and mixtures therefrom. Yet more preferably, the metallic ions used herein are selected from the group consisting of ions of sodium, zinc and mixtures therefrom.

The parent acid copolymers of the invention may be neutralized as disclosed in U.S. Pat. No. 3,404,134.

The ionomer copolymers used herein may optionally contain other unsaturated comonomers. Specific examples of preferable unsaturated comonomers include, but are not limited to, methyl acrylate, methyl methacrylate, ethyl acrylate, ethyl methacrylate, isopropyl acrylate, isopropyl methacrylate, butyl acrylate, butyl methacrylate and mixtures thereof. In general, the ionomeric copolymers used herein may incorporate 0 to about 50 wt %, or preferably, 0 to about 30 wt %, or more preferably, 0 to about 20 wt %, of the other unsaturated comonomer(s), based on the total weight of the copolymer.

The high level of inorganic cation neutralization along with the percent acid comonomer in the ionomer define the melt flow index (MFI) or melt viscosity. Here we use the melt flow index (MFI) as the measure of melt processability, where we desire only those compositions that have MFI below 0.05. The MFI is a measure of the ease of flow of the melt of a thermoplastic polymer. It is defined as the mass of polymer in grams flowing in 10 minutes through a capillary of specific diameter and length by a pressure applied via prescribed alternative gravimetric weights for alternative prescribed temperatures. The method is given in ASTM D1238 incorporated herein by reference.

Melt flow rate is inversely proportional to melt viscosity at the conditions of the test.

The composite article of the invention may also contain one or more layers of high strength polyolefin fiber composites such as the cross-plied unidirectional polyethylene fiber composite Dyneema HB26 from DSM Co. (Netherlands).

The fibers which are utilized in the composite may comprise hybrids, for example, aramid and carbon; aramid and glass; aramid, carbon and glass; carbon, glass and extended chain polyethylene, etc. Hybridization of the fibers not only reduces costs, but in many instances improves the performance in armor structures. It is known that aramid fiber and carbon are significantly lighter than glass fiber. The specific modulus of elasticity of aramid is nearly twice that of glass, while a typical high tensile strength-grade of carbon fiber is more than three times as stiff as glass in a composite. However, aramid fiber has a lower compressive strength than either carbon or glass, while carbon is not as impact resistant as aramid. Therefore, a hybrid of the two materials results in a composite that is (1) lighter than a comparable glass fiber-reinforced plastic; (2) higher in modulus, compressive strength and flexural strength than an all-aramid composite; and (3) higher in impact resistance and fracture toughness than an all-carbon composite.

In one embodiment, surfactant or wetting aids are added to aqueous dispersions and emulsions to prevent dewetting on the repellant aramid fabrics. Plasticizers may also act as surfactant. Sodium dodecyl sulfate (SDS), Alkanol 6112 (DuPont, Wilmington, Del.), Zonyl® FSA (DuPont, Wilmington, Del.), 1-decanol, Surfynol® 440 (Air Products, Co., Allentown, Pa.), Environgen 360® (Air Products, Co), Dynol® 607 (Air Products, Co), Aerosol OT-DG (Cytec, Co.), Ethal EH-5 (Ethox Co.), Foryl 5999 (Pulcra, Co), Genapol X080 (Clariant Co.) and many other surfactants can be used. The water repellant coating of the invention can also be a surfactant and can be added in the form of an aqueous dispersion or emulsion.

Thickeners such as high molecular weight (MW=$6\times10^6$ g/mol) polyethylene oxide, cellulose, gelatin and many other polymers, silica, and clays can also be used in the dispersions and emulsions to facilitate coating uniformity on the repellant aramid fabrics during drying. Other commercially available thickeners include Acrysol ASE-75 and Acrysol RM-6000 from Rohm and Haas, Co. These thickeners can be mixed with surfactants as is well known in the art.

EXAMPLES

Because melt cast films are unavailable for low melt flow index highly neutralized ionomers, these may be applied to the fibrous layer surface in the form of an aqueous dispersion. The ionomer may also be plasticized. Any suitable plasticizer may be selected by one skilled in the art, for example the plasticizer is selected from the group consisting of long chain olefin acids or olefin alcohols.

Twelve inch wide strips of fibrous fabric were rod coated with the aqueous dispersion ionomers or other polymers. A liquid layer is deposited with these methods, which is then dried under various conditions. For the examples here, 20° C. overnight on the benchtop was used, but in other cases drying ovens for a few minutes at 100° C. to 150° C. were used. The thickness of the liquid layer was adjusted by choosing different rod sizes and levels of dilution of the coating solution. This would then give the correct solid coating weight fraction as a function of the weight of the Kevlar® fabric. Many other standard liquid coating methods are suitable including slot die, spray, roll, transfer, graviere, dip coating, and related methods.

After coating individual layers of woven Kevlar® fabric with aqueous polymers on one side of the fabric, all were pressed for 20 min at 500-2000 psi at temperatures above 125° C. to make multi-layer composite articles. Composite article areal densities ranged from 1.6 psf to 2.2 psf depending on the test.

A 17 grain right circular cylinder projectile was used for ballistic tests.

Peel tests were carried out at a 90 or 180 degree peel angle at 20 C. Reported values were obtained with methods including ASTM D 1876-08.

Kevlar® fabric used in the indicated studies below had a repellant fluorocarbon treatment. Fibrous fabrics studied here were treated with a fluorinated acrylate copolymers or methacrylate copolymers. Zonyl® D from DuPont is an example, and these repellant fluorocarbon treated Kevlar® fabrics are sold as S751-F. Untreated non-repellant Kevlar® fabric (S751-G) is also used here. All fabrics were obtained from JPS Composites, Co (Greenville S.C.).

Michem 2960 (Michelman Co., Ohio) dispersion of ethylene-acrylic acid (E-AA) copolymer (10 mol % AA comonomer) in ionomer form was used as the ionomer layer. Counterion was potassium at 100% neutralization. The melting point is high (Tm=91° C.) because of the low percent acid comonomer. The ionomer has no melt flow at 190° C. (i.e., melt flow index=0 in Table 1) once it is in a dried state. Drying before melt flow index measurement is important and was done at 120° C. for 12 hours in vacuum.

Other comparative examples used Michem 4983 (Michelman Co., Ohio), a dispersion of ethylene-acrylic acid (E-AA) copolymer (20 mol % AA comonomer) without metal counterions. It is a low melting, low crystallinity resin (Tm=72° C.) that has high melt flow (i.e., a high melt flow index; Table 1) at 190° C. once it is in a dried state. Table 1 shows neutralization levels and their inverse correlation with melt flow index values as is known in the art.

TABLE 1

| Resin | Melt Flow Index At 190° C. (g/10 min) | % Neutralization | Ion |
|---|---|---|---|
| Michem 2960 | 0 | 100 | K+ |
| Michem 4983 | 200 | 0 | none |
| Ionomer A | 0.9 | 59 | Na+ |
| Ionomer B | 2.8 | 29 | Na+ |
| E-MAA## precursor for ionomer B | 25 | 0 | none |

For the Examples and Comparative Examples in Table 2, a different projectile was used and thicker composite articles were studied. A 17 grain fragment simulating projectile was impacted into a number of 2.1 to 2.2 pound per square foot (psf) composite articles containing 55 to 64 layers of fabric that were pressed at 500 psi. The V50 results were then normalized to exactly 2.2 psf for easy comparison and summarized in Table 2. For Example 1, Michem 2960 (from Michelman Co., Ohio) dispersion was coated onto S751F Kevlar® fabric (fluoro repellant treated), and pressed at 125° C. and 500 psi for 20 min into a ballistic composite article. This is an aqueous dispersion and the polymer is the ethylene-acrylic acid (E-AA) copolymer ionomer highly neutralized with potassium discussed above. The coating solution contained Alkanol 6112 surfactant that has an active ingredient of about 50 wt % 1-decanol and 10 wt % polyoxyethylene sobitan monooleate in water. By weight of 2960 resin solids, the 1-decanol surfactant (wetting aid) was present at about 10 wt % based on the solid film weight after the film is dried. The V50 from the example is shown in table 2. V50 is a statistical measure that identifies the average velocity at which a bullet or a fragment penetrates the armor equipment in 50% of the shots, versus non penetration of the other 50%. The parameter measured is V50 at zero degrees where the degree angle refers to the obliquity of the projectile to the target.

In Comparative Example 1 Permax 200 polyurethane emulsion coating was applied to S751F and pressed into a ballistic composite article at 125° C. and 500 psi (352272 kg/m2) for 30 min. Permax 200 polyurethane emulsion (Lubrizol Co.) comprises a strong elastomeric low Tg film when dried.

In Comparative Example 2, Michem 4983 E-AA copolymer dispersion from Michelman Co., Ohio was applied to S751F and pressed into a ballistic composite article at 125 C and 500 psi for 20 min. This is a high melt flow resin after it is dried because of the low level of neutralization (Table 1).

In Comparative Example 3, Michem 4983 E-AA copolymer dispersion from Michelman Co., Ohio was used. This is essentially the same as Comp example 3 except the resin weight percent based on fabric weight was 13 wt %.

In Example 4, Michem 2960 was coated and pressed into composite articles in the same way as in Ex. 1, except it was applied to non-fluorinated griege Kevlar® fabric (S751-G).

Table 2 shows that the combination of Kevlar®, and a highly neutralized coating that leads to superior ballistic properties as measured by the V50 value.

TABLE 2

| Sample | % Resin By weight of total construction | V50 (feet/second) |
|---|---|---|
| Example 1 | 11 | 2825 |
| Comparative Example 1 | 10 | 2580 |
| Comparative | 9 | 2555 |

TABLE 2-continued

| Sample | % Resin By weight of total construction | V50 (feet/second) |
|---|---|---|
| Example 2 Comparative Example 3 | 13 | 2525 |
| Example 4 | 11 | 2710 |

We claim:

1. An impact resistant composite article comprising one or more stacks layered together, each stack comprising two or more fibrous layers with a non-melt-processable ionomer disposed between at least two of the fibrous layers in which the non-melt-processable ionomer is at least 85% neutralized based on the total number of equivalents of carboxylic acid moieties in the ionomer and has a zero melt flow index at 190° C. melt flow test of ASTM D1238, and wherein
    (i) the weight fraction of solid ionomer in the multilayer composite article is between 5 and 16%, and
    (ii) the ionomer is neutralized with an ion selected from the group consisting of sodium, potassium, lithium, beryllium, magnesium, calcium, strontium, barium, tin, lead, aluminum, titanium, tantalum, cerium and combinations thereof.

2. The composite article of claim 1 in which the ionomer comprises between 5 mole % and 15 mole % of acid comonomer.

3. The composite article of claim 2 in which the ionomer comprises between 8 mole % and 12 mole % of acid comonomer.

4. The composite article of claim 1 in which the ionomer is at least 95% neutralized based on the total number of equivalents of carboxylic acid moieties.

5. The composite article of claim 1 in which the ionomer is at least 100% neutralized based on the total number of equivalents of carboxylic acid moieties.

6. The composite article of claim 1 in which the ionomer is in the form of a coating partially covering the fibers in at least some of the fibrous layers.

7. The composite article of claim 1 in which the ionomer forms a discrete layer between at least two of the fibrous layers.

8. The composite article of claim 7 in which the fibrous layers comprise fiber bundles and at least half of the thickness of any bundle the bundle remains un-impregnated by ionomer.

9. The composite article of claim 1 in which at least some of the fibrous layers comprise nonwoven fabrics.

10. The composite article of claim 1 in which at least one of the fibrous layers is a woven fabric.

11. The composite article of claim 1 in which at least one stack comprises at least one pair of adjacent fibrous layers of different composition.

12. The composite article of claim 11 in which the fibrous layer comprises poly (p-phenylene terephthalamide).

13. The composite article of claim 1 in which the fibrous layer is at least partially coated with a water repellant material.

14. The composite article of claim 13 in which the water repellant material comprises a material that is at least partially fluorinated.

15. The composite article of claim 14 in which the fluorinated material is a partially fluorinated acrylate copolymer or a partially fluorinated methacrylate copolymer.

16. The composite article of claim 1 in which the ionomer further comprises up to 30% dry weight of a material selected from the group consisting of a plasticizer, a surfactant, and a mixture or combination thereof.

17. The composite article of claim 16 in which the plasticizer is a long chain fatty acid.

18. The composite article of claim 16 in which the plasticizer is 1-decanol.

19. An impact resistant composite article comprising one or more stacks layered together, each stack comprising two or more fibrous layers with a non-melt-processable ionomer disposed between at least two of the fibrous layers in which the non-melt-processable ionomer is at least 100% neutralized based on the total number of equivalents of carboxylic acid moieties in the ionomer and has a zero melt flow index at 190° C. melt flow test of ASTM D1238, and wherein
    (i) the weight fraction of solid ionomer in the multilayer composite article is between 5 and 16% and the weight fraction of fiber is between 84 and 95%, and
    (ii) the ionomer is neutralized with an ion selected from the group consisting of sodium, potassium, lithium, beryllium, magnesium, calcium, strontium, barium, tin, lead, aluminum, titanium, tantalum, cerium and combinations thereof.

* * * * *